US009618353B2

(12) United States Patent
Ruys et al.

(10) Patent No.: US 9,618,353 B2
(45) Date of Patent: Apr. 11, 2017

(54) VEHICLE REQUEST DEVICE

(75) Inventors: Godert Otto Anthony Ruys, Amsterdam (NL); Tako Jelle Bruinsma, Amsterdam (NL); Steven Hans Jan Blom, Aarte Bixtel (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/113,111

(22) PCT Filed: Apr. 13, 2012

(86) PCT No.: PCT/EP2012/056830
§ 371 (c)(1),
(2), (4) Date: Oct. 21, 2013

(87) PCT Pub. No.: WO2012/143302
PCT Pub. Date: Oct. 26, 2012

(65) Prior Publication Data
US 2014/0051465 A1 Feb. 20, 2014

(30) Foreign Application Priority Data
Apr. 19, 2011 (GB) .................................. 1106555.4

(51) Int. Cl.
*G01C 21/36* (2006.01)
*G08G 1/00* (2006.01)
(Continued)

(52) U.S. Cl.
CPC ....... *G01C 21/362* (2013.01); *G01C 21/3676* (2013.01); *G08G 1/202* (2013.01);
(Continued)

(58) Field of Classification Search
CPC ........ H04W 4/02; H04W 64/00; G06Q 10/02; G06Q 10/06; G06Q 10/0631; G06Q 10/08;
(Continued)

(56) References Cited

U.S. PATENT DOCUMENTS 5,168,451 A 12/1992 Bolger
5,973,619 A 10/1999 Paredes
(Continued)

FOREIGN PATENT DOCUMENTS

EP 2273468 A1 1/2011
FI WO 2005022426 A1 * 3/2005 ............. G06Q 30/02

OTHER PUBLICATIONS

International Search Report issued Aug. 2, 2012 for International Application No. PCT/EP2012/056830.

*Primary Examiner* — Matthew Sams

(57) ABSTRACT

A device 20 for requesting a vehicle to a location associated with the device. The device 20 comprises input means 126 arranged to generate a vehicle request upon receipt of a user input, said device 20 being arranged to allow at least a second vehicle request to be generated using the input means before the vehicle associated with a first vehicle request has departed from the location associated with the device. The device 20 is arranged, for each vehicle request, to generate a message indicative of the status of the vehicle request and to display the generated message on a display 124. The device is arranged to stop displaying the message on the display 124 when the requested vehicle departs from the location.

17 Claims, 10 Drawing Sheets

(51) Int. Cl.
  *H04W 64/00*    (2009.01)
  *H04W 76/02*    (2009.01)
  *H04W 4/02*     (2009.01)
(52) U.S. Cl.
  CPC ........... *H04W 4/02* (2013.01); *H04W 64/006*
           (2013.01); *H04W 76/02* (2013.01)
(58) Field of Classification Search
  CPC .............. G06Q 10/025; G06Q 10/047; G06Q
           10/06311; G06Q 10/063116; G06Q
           10/06314; G06Q 10/08355; G06Q
           10/109; G06Q 10/1097; G06Q 30/02;
                        G06Q 30/0284
  USPC ....................................................... 455/457
  See application file for complete search history.

(56) References Cited

U.S. PATENT DOCUMENTS

| | | | |
|---|---|---|---|
| 7,062,300 B1 * | 6/2006 | Kim ........................... 455/569.1 |
| 7,840,427 B2 * | 11/2010 | O'Sullivan ............ G06Q 10/00 340/988 |
| 2002/0105939 A1 * | 8/2002 | Vassilovski ........... H04W 76/04 370/349 |
| 2003/0083889 A1 * | 5/2003 | Macklin ................. G06Q 10/02 705/5 |
| 2003/0177020 A1 * | 9/2003 | Okamura ............... G06Q 10/02 705/5 |
| 2006/0059023 A1 * | 3/2006 | Mashinsky ............ G06Q 10/02 705/5 |
| 2006/0112386 A1 * | 5/2006 | Moon ........................ G06F 8/65 717/174 |
| 2006/0293937 A1 * | 12/2006 | Sohm ............. G06Q 10/063116 705/7.16 |
| 2007/0027825 A1 * | 2/2007 | Pearce ................... G06Q 10/02 705/417 |
| 2008/0195428 A1 * | 8/2008 | O'Sullivan ............ G06Q 10/00 705/6 |
| 2009/0030885 A1 * | 1/2009 | DePasquale ........... G06Q 10/02 |
| 2009/0326991 A1 * | 12/2009 | Wei .......................... G06Q 10/02 705/5 |
| 2011/0047478 A1 * | 2/2011 | Ellsworth ............... G06F 9/543 715/747 |
| 2011/0059693 A1 * | 3/2011 | O'Sullivan ............ G06Q 10/00 455/41.1 |
| 2011/0099040 A1 * | 4/2011 | Felt ..................... G06F 17/3087 705/7.12 |
| 2011/0313804 A1 * | 12/2011 | Camp et al. .................. 705/7.13 |
| 2012/0041675 A1 * | 2/2012 | Juliver et al. .................. 701/465 |
| 2012/0290652 A1 * | 11/2012 | Boskovic ................ G06Q 50/30 709/204 |
| 2013/0024249 A1 * | 1/2013 | Zohar ..................... G07B 15/02 705/13 |
| 2013/0297175 A1 * | 11/2013 | Davidson ............... G07B 15/06 701/99 |
| 2015/0039362 A1 * | 2/2015 | Haque .................... G06Q 40/08 705/7.12 |
| 2015/0039365 A1 * | 2/2015 | Haque ............. G06Q 10/06311 705/7.13 |
| 2015/0046080 A1 * | 2/2015 | Wesselius ............... G08G 1/202 701/428 |

\* cited by examiner

VEHICLE REQUEST DEVICE

CROSS-REFERENCES TO RELATED APPLICATIONS

This application is the National Stage of International Application No. PCT/EP2012/056830, filed on Apr. 13, 2012, and designating the United States. The application claims the benefit of United Kingdom Patent Application No. GB1106555.4 filed Apr. 19, 2011. The entire content of these applications is incorporated herein by reference.

FIELD OF INVENTION

The present invention relates to a device for requesting a vehicle, such as a taxi, to a location associated with the device. In preferred embodiments, the device is arranged to be fixedly secured to a surface, such as in a bar, restaurant or hotel, and to provide feedback to users as to the status of any vehicle requests. The device may form a component part of a vehicle request management system arranged to manage requests by a user for a taxi or other similar form of transport.

BACKGROUND TO THE INVENTION

In recent years, with the adoption of location-aware mobile devices, such as smart phones, by the general public, a number of software applications (or "apps") have been created to improve the experience of ordering and requesting taxis. Examples of these apps include: Hailo—http://hailocab.com; myTaxi—http://www.myaxi.net/; and Taxi Magic—http://taximagic.com.

Through the use of such apps on a location-aware mobile device, e.g. one having GNSS (Global Navigation Satellite Systems) signal reception and processing functionality, a user can easily request a taxi to their current location, even if they themselves are not aware of their surroundings.

For example, with the Hailo app, a user is shown a map on their mobile device, centred on their current location, indicating the real-time location of the closest available taxis to their location and an estimate of the time that it will take each taxi to reach the location. This information is downloaded from a server system that receives periodic updates from location-aware devices in each of the taxis. The user can select a taxi by touching an icon representative of the taxi on a touchscreen of their device, and an order request is then sent to the selected taxi via the server. If the driver accepts the order request, a confirmation message is sent to the user. The user is also provided with a profile picture of the driver, a user rating associated with the driver, details of the selected taxi and a real-time countdown of when the taxi should arrive at the pick-up location; this is an estimate as it doesn't take account of traffic, roadworks and other such events that may cause a delay to the taxi. The user can also see the current position of the selected taxi on a map as it approaches the pick-up location. A notification is sent to the user, again via the server, that the taxi has arrived at the pick-up location. Once the journey has been completed, the user can pay for the trip using a credit card or similar form of non-cash payment; assuming that the details of the card have been previously associated with their account on the server. The user then receives a message from the server confirming the details of the journey and a receipt for the amount paid. The user can also take the opportunity to rate their driver following completion of the journey.

Despite the improvements that have been made in relation to requesting taxis through the use of location-aware devices, the Applicant believes that there remains scope for further improvement and the provision of additional functionality to the user, for example, by using information obtained from navigation devices within the individual taxis. As is well known in the art, such navigation devices typically include GNSS signal reception and processing functionality, such as a GNSS antenna, by means of which satellite-broadcast signals, including location data, can be received and subsequently processed to determine a current location of the device. The navigation devices also typically have route planning functionality that allows a route to be calculated between an origin and a destination using digital map data, together with suitable means, such as a display and speaker, to provide navigation instructions to the driver based on the calculated route.

SUMMARY OF THE INVENTION

In accordance with a first aspect of the invention there is provided a device for requesting a vehicle to a location associated with the device, the device comprising:

input means arranged to generate a vehicle request upon receipt of a user input, said device being arranged to allow at least a second vehicle request to be generated using the input means before the vehicle associated with a first vehicle request has departed from the location associated with the device; and communication means for communicating with a remote device, said communication means being arranged to transmit the generated vehicle requests to the remote device, said vehicle requests comprising data indicative of the location associated with the device, and said communication means being further arranged to receive information from the remote device relating to the status of a transmitted vehicle request;

wherein said device is arranged, for each vehicle request, to generate a message indicative of the status of the vehicle request using the received information and to display the generated message on a display; and wherein said communication means is further arranged to receive an indication from the remote device that a vehicle that has accepted a vehicle request has departed from the location associated with the device, said device being arranged to stop displaying the message on the display associated with the vehicle on receipt of said indication.

In accordance with a further aspect of the invention there is provided a method of requesting a vehicle to a location, the method comprising:

receiving a user input on a device and generating a request for a vehicle to a location associated with the device in response thereto, wherein the device is arranged to allow a second vehicle request to be generated using the input means before the vehicle associated with a first vehicle request has departed from the location associated with the device;

transmitting the generated vehicle request to a remote device;

receiving information from the remote device relating to the status of the transmitted vehicle request and using the information to generate a message for display indicative of the status of the vehicle request;

displaying the generated message on a display; and receiving an indication from the remote device that a vehicle that accepted the vehicle request has departed from the location associated with the device and stopping the display of the message in response thereto.

The present invention in this further aspect may include any or all of the features described in relation to the first aspect of the invention, and vice versa, to the extent that they are not mutually inconsistent. Thus, if not explicitly stated herein, the device of the present invention may comprise means for carrying out any of the steps of the method described.

The means for carrying out any of the steps of the computer implemented method may comprise a set of one or more processors configured, e.g. programmed, for doing so. A given step may be carried out using the same or a different set of processors to any other step. Any given step may be carried out using a combination of sets of processors.

The present invention relates to a device by which a plurality of users can call vehicles to a specific location. For example, the device may be positioned in a hotel, bar or the like, and the device can be used to request one or more taxis to a location associated with the hotel or bar, such as the front entrance or street corner.

The device has input means through which a plurality of users can place a request for a vehicle. Due to the nature of the device, it is arranged to allow multiple requests to be made in close succession, i.e. before a previous request has been fulfilled. The requests are transmitted by the device indirectly, via a remote device, such as a server. It is also envisaged, however, that some or all of the information may be directly received from or transmitted to a device associated with a vehicle, instead of indirectly via a server. The device is further arranged to generate and display a message associated with each vehicle request, so as to inform the user who initiated the request with the status of the request. These messages may be displayed on a display of the device itself, or the device may cause the messages to be displayed on a remote display device. The content of these messages can, and preferably does, vary as the vehicle approaches the location associated with the device. The messages are no longer caused to be displayed by the device once confirmation has been received from the server that the request has been completed, i.e. that the vehicle has arrived at and then departed from the location associated with the device. This ensures that the information being provided to the users is always up to date, and that old requests are quickly removed automatically.

As will be appreciated by those skilled in the art, the device of the present invention is associated with a particular location. For example, the device can be mounted to a reception desk or bar of a hotel or restaurant. The location associated with the device can be the actual location of the device, or it may be any other location as desired. For example, if the device is positioned in a building, then the location associated with the device may be an entrance/exit of the building, or a location on the street that is more accessible to vehicles, such as a nearby taxi rank.

The location associated with the device may be stored in a memory of the device. Alternatively, the location may be stored on the server, together with an indicator representative of the device. For example, the device may have a reference number, and the server associates a location with the reference number. As will be appreciated, by storing the location on the server, then the location associated with the device can easily be changed. This can be, for example, because the same device is to be moved to a different position, and its associated location thus needs to be changed. Alternatively, the usual location associated with the device may be blocked, e.g. due to road works or the like, and thus the location can be temporary changed.

A device may have a single associated location, or in some embodiments it may have a plurality of associated locations. For example, a device may have a first associated location during a first time period, and a second associated location during a second time period. For example, a first location may be desired during the day, and a second location may be desired at night (e.g. due to traffic or parking restrictions). In other words, the location associated with a device may be time-dependent.

In other embodiments, the device may comprise location determining means. The location determining means could be of any type. For example, the device could comprise means for accessing and recessing information from WiFi access points or cellular communication networks, and using this information to determine its location. In preferred embodiments, however, the device comprises a global navigation satellite systems (GNSS) receiver, such as a GPS receiver, for receiving satellite signals indicating the position of the receiver at a particular point in time, and which preferably receives updated position information at regular intervals. In such embodiments, the location associated with the device is taken to be the location output by the location determining means.

The device of the present invention comprises an input means that is arranged to generate a vehicle request upon receipt of a user input; the vehicle request being an indication that a vehicle, such as a taxi or any other form of transport, is desired at the location associated with the device.

The device and/or the input means is arranged to allow at least a second vehicle request to be generated before the vehicle associated with a first vehicle request has departed from the location associated with the device. In other words, and in contrast to many conventional mobile (or smart) phone apps that only allow a single vehicle request to made at any one time (i.e. a vehicle request must be completed before a new request can be made), the device of the present invention and/or the input means is arranged to allow multiple vehicle requests to be made and subsist simultaneously.

The input means can be any suitable user interface as desired. For example, the input means may be a button, a switch or the like. The button may be a hard button, or it may be soft key that can be programmed to provide different functionality at different times. It is also envisaged that the input means may be a virtual icon on a touchscreen of the device. The input means is preferably arranged to only accept a second, further vehicle request after a predetermined period of time following a first vehicle request. The predetermined period of time may be between 1-10 seconds.

The device of the present invention may further comprise an input means that is further arranged to cancel a previously made vehicle request. This input means may be the same input means as that used to generate a vehicle request, or it may be a separate input means. When the input means used to cancel a previous vehicle request is a separate means, the input means may be a button, switch or the like. The button may again be a hard button, a soft key, or a virtual icon on a touchscreen of the device.

The device comprises communication means for communicating with a remote device, such as a server. The communication means can be of any suitable form. For example, the device may comprise one or more physical interfaces by means of which data signals can be transmitted to and received from the device. Alternatively, or additionally, the communication means comprises one or more wireless transmitters/receivers to allow communication over cellular telecommunications and other signal and data networks, for example WiFi, Wi-Max, GSM, GPRS and the like.

The communication means is preferably configured to transmit each generated vehicle request to a server. Each of the transmitted requests comprises data indicative of the location associated with the device. The data can be of any suitable and desired form, and thus may comprise an actual location, e.g. a longitude-latitude pair, or it may comprise an identifier indicative of the device, and which can be used by the server to determine the associated location.

The server, at least in preferred embodiments, acts as a dispatch centre to select a suitable vehicle or vehicles that are available to meet the request. The server is therefore part of a vehicle request management system, and comprises communication means arranged to communicate with the one or more devices in accordance with the present invention and one or more mobile devices, each mobile device being associated with a vehicle. The server may also be arranged to communicate with one or more other mobile devices, such as mobile telephones, PDAs, tablet computers or the like, that can also be used to make vehicle requests.

The one or more mobile devices that are each associated with a vehicle may be portable devices, e.g. capable of being handheld, and which, for example, may be removable mounted within a vehicle. In other embodiments, the one or more mobile devices may be in-vehicle systems, i.e. devices that are permanently mounted within vehicles. Each of the one or more devices are arranged to transmit positional data relating to the current position of the device to the server. Accordingly, each of the one or more mobile devices are capable of determining the current position of the device, and thus comprise location determination means. The location determining means can be of any type. For example, a mobile device could comprise means for accessing and receiving information from WiFi access points of cellular communication networks, and using this information to determine its location. In preferred embodiments, however, a mobile device comprises a global navigation satellite system (GNSS) receiver, such as a GPS receiver, for receiving satellite signals indicating the position of the receiver at a particular point in time, and which preferably receives updated position information at regular intervals.

The one or more mobile devices preferably also include means for determining the relative displacement of the vehicle in which the device is carried, thereby allowing, for example, the speed and driving direction of the vehicle at any point in time to e determined. The means could comprise one or more electronic gyroscopes or accelerometers in the device, or the device could have access to such sensors in the vehicle itself, e.g. using the vehicle CAN bus.

Accordingly, in preferred embodiments, the mobile devices carried by vehicles that can accept vehicle requests transmitted by the device of the present invention comprise navigation apparatus, such as portable navigation devices (PNDs) that can be removably mounted within a vehicle or in-vehicle navigation systems, and which preferably include GNSS signal reception and processing functionality. It will be appreciated, however, that the mobile devices may also comprise mobile telephones, PDAs, tablet computers or the like running suitable software programs.

When the server receives a vehicle request from a device in accordance with the present invention, the server may analyse the content of the request and send the request to only a single vehicle. Alternatively, in other embodiments, the request may be sent to multiple vehicles. In either case, a vehicle will accept the generated vehicle request, and the communication means of the device is arranged to receive information, from the server or directly from the mobile device in the vehicle that accepted the request, relating to the vehicle in question. In particular, the communication means of the device is arranged to receive information from the server relating to the status of a transmitted vehicle request.

The received information may be of any suitable and desired form. For example, the information may comprise one or more of the following: an indication that a vehicle request has been accepted; information relating to the driver of the vehicle that has accepted the request, such as the driver's name, picture or rating; information relating to the vehicle that has accepted the request, such as the vehicle's registration plate number or company number; an estimated time of arrival at the location associated with the device; and the current location of the vehicle. By using route planning software, either on the server or on a navigation apparatus of the vehicle, the estimated time of arrival can take account of: historical travel times and speeds; historic, current and/or estimated future traffic conditions; availability of taxi-lanes; etc, to provide an accurate estimated time of arrival. Even if the vehicle is currently still completing a previous journey, such software can be used to generate an estimated time of arrival (ETA) based on the time to complete the current journey and the time to then travel to the location associated with the device.

The information relating to the vehicle may be received only once, e.g. when the vehicle request is accepted. Alternatively, in more preferred embodiments, the information, or at least some of the information, relating to the vehicle is updated, e.g. periodically, until the vehicle has arrived at the location associated with device. For example, the vehicle may repeatedly send an indication of its current position. Similarly, the vehicle may send an updated ETA if this changes, for example, due to traffic or other similar event. Further, and as will be discussed in more detail below, the communication means of the device may be arranged to receive an indication from the server that the vehicle has arrived at the location associated with the device.

As will be appreciated, the device of the present invention is configured to allow multiple vehicle requests to be made and be pending simultaneously. In other words, the device is designed to be used by multiple people (or least to handle requests from multiple people), rather than just a single person. For each vehicle request that is made on the device, a message is generated indicative of the status of the vehicle request, and these messages are displayed on a display.

The display on which the messages are displayed may be integral to the device. In other words, the device of the present invention may comprise a display for displaying the generated messages. In other embodiments, the display may be separate to the device, such as a display panel that can be mounted on a wall, and the device is in communication with the display, e.g. via a wired or wireless connection. As will be understood, by using a separate display panel, typically a larger display can be used and thus more detailed information can be provided to the user(s). For example, a digital map may be displayed on the display panel, with icons representative of the current location of vehicles that have accepted vehicle requests, or alternatively of all vehicles that can accept vehicle requests. The message for a particular vehicle may be shown next to the appropriate icon, or the messages may be shown in a portion of the display panel separate from the map.

The content of the message generated in response to a vehicle request can, and typically will, vary based on the status of the vehicle request. For example, an initial message may be generated in response to a vehicle request indicating that a request has been made. The content of the message may then be changed when a vehicle accepts the request, and, for example, supplemented with the received information relating to the driver and/or vehicle that has accepted the request. For example, the message may include one or more of: details of the driver (e.g. name, photograph, rating, etc); details of the vehicle (e.g. vehicle type, colour, or some other type of indication); and an estimate time of arrival. The content of the message may also be changed when the device receives an indication that the vehicle has arrived at the location associated with the device and/or is within at least one of a predetermined distance and time of the location.

When multiple requests are made using the input means of the device, each of which is still pending, then a corresponding number of messages will be displayed on the display. The messages may be displayed on the display in an order representative of the order that they are requested. Alternatively, the order of the messages may be based, for example, on the estimated time of arrival of the vehicles at the location associated with the device. In such embodiments, the messages may comprise an identifier as to the order in which they were requested.

Messages are removed from the display either upon a cancellation of a request, e.g. using the above described input means, and/or upon receipt of an indication from the server that the related vehicle has arrived at and then departed from the location associated with the device. Messages are therefore only caused to be shown on the display for pending vehicle requests; old or cancelled vehicle requests thus being automatically removed from the display.

The indication that the related vehicle has departed from the location associated with the device, i.e. that the vehicle as arrived, picked up the user who made the request (or the user who made the earliest request), and then departed, is preferably based on a determination that the vehicle stopped at or in the vicinity of the location associated with the device for at least a predetermined period of time, and then started moving away from the location. The indication could be generated by the driver of the vehicle, e.g. by a suitable input on a navigation apparatus, and sent then sent directly, or indirectly via the server, to the communication means of the device. In other embodiments, the indication may be automatically generated at the server.

In addition to displaying messages on a display indicative of the status of the vehicle request, the device may further comprise one or more output means to provide an indication of the status of a vehicle request. For example, the device may comprise at least one of means for generating an audible output, e.g. a speaker, and means for generating a visual output, e.g. an LED or other light emitting device. The output means may be arranged to provide a visual and/or audible output when a requested vehicle arrives at the location associated with the device and/or when a vehicle accepts a vehicle request. As will be understood, the one or more output means may be used in conjunction with or as an alternative to the messages that are displayed. The one or more output means may be integral with the device, or in some embodiments may be separate from the device.

As will be appreciated, the device of the present invention is preferably constructed in such a way that it can affixed to a surface, e.g. to a wall, bar, reception, etc. Thus, in a preferred embodiment, the device comprises a casing. The casing may comprise means to enable the device to be secured to a surface. For example, the casing may comprise one or more openings through which screws (or other similar means) can be placed. The casing may be waterproof, to stop water entering the interior of the device. The device may have one or more physical interfaces for receiving power. Additionally, or alternatively, the device may comprise one or more batteries; thereby allowing, for example, the device to be moved to temporary location, such as outside on the street.

Although the device of the present invention has primarily been described as receiving information from a server as to, for example, the arrival and/or departure status of a vehicle completing a transmitted request, it will be appreciated that the communication means of the device may additionally or alternatively be arranged to communicate directly with, e.g. receive information from, a mobile device within the vehicle that accepts a transmitted request. For example, the determination that a vehicle has arrived and/or departed from the location associated with the device may be received directly from the mobile device carried in the vehicle itself. The determination may even be made at the device using position and/or movement information received from the mobile device carried in the vehicle. Accordingly, it will be appreciated that some or all instances of information being transmitted to or received from a server described above may be replaced, in other embodiments, with information being transmitted to or received from at least one mobile device, e.g. navigation apparatus, associated with a vehicle. It will also be appreciated that some or all processing steps made at the server in the above described embodiments may instead occur on processing means of the device.

It will also be appreciated that the present invention extends to a server arranged to communicate with one or more devices for requesting vehicles to locations associated with the devices; the server and one or more devices together forming a vehicle request management system.

Thus, according to another aspect of the invention there is provided a vehicle request management system, the system comprising at least one device for requesting a vehicle to a location associated with the device and a server, said at least one device comprising:

input means arranged to generate a vehicle request upon receipt of a user input, said device being arranged to allow at least a second vehicle request to be generated using the input means before the vehicle associated with a first vehicle request has departed from the location associated with the device; and communication means for communicating with the server, said communication means being arranged to transmit the generated vehicle requests to the remote device, said vehicle requests comprising data indicative of the location associated with the device, and said communication means being further arranged to receive information from the server relating to the status of a transmitted vehicle request;

wherein said device is arranged, for each vehicle request, to generate a message indicative of the status of the vehicle request using the received information and to display the generated message on a display; and wherein said communication means is further arranged to receive an indication from the server that a vehicle that has accepted a vehicle request has departed from the location associated with the device, said device being arranged to stop displaying the message on the display associated with the vehicle on receipt of said indication; and said server comprising:
communication means arranged to communicate with said at least one device and a plurality of vehicles; and processing means arranged to select a vehicle from said plurality of vehicle in response to receiving a vehicle request from said at least one device;

wherein said communication means is arranged to receive positional data relating to the position of at least the selected vehicle over time;

wherein said processing means is arranged to use the received positional data to monitor the status of the vehicle request; and wherein said communication means is arranged to transmit information relating to the status of the vehicle request to said at least one device.

The present invention in this further aspects may include any or all of the preferred and optional features described herein as appropriate.

As will be appreciated by those skilled in the art, all of the described aspects and embodiments of the present invention can, and preferably do, include as appropriate, any one or more or all of the preferred and optional features described herein.

It will also be appreciated that the present invention extends to a computer program product comprising computer readable instructions adapted to cause a device to perform in the above described manner when executed on suitable data processing means, such as one or more processors. The invention also extends to a computer software carrier comprising such software. Such a software carrier could be a physical (or non-transitory) storage medium or could be a signal such as an electronic signal over wires, an optical signal or a radio signal such as to a satellite or the like.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described byway of illustrative example with reference to the accompanying drawings, in which.

DETAILED DESCRIPTION OF THE PREFERRED EMBODIMENTS

The present invention, at least in preferred embodiments, is directed to a vehicle request management system, and in particular to a system for managing the requests for taxis between people and the individual taxis. The architecture for a system in accordance with the present invention is described with reference to FIG. 1.

Figure 1:
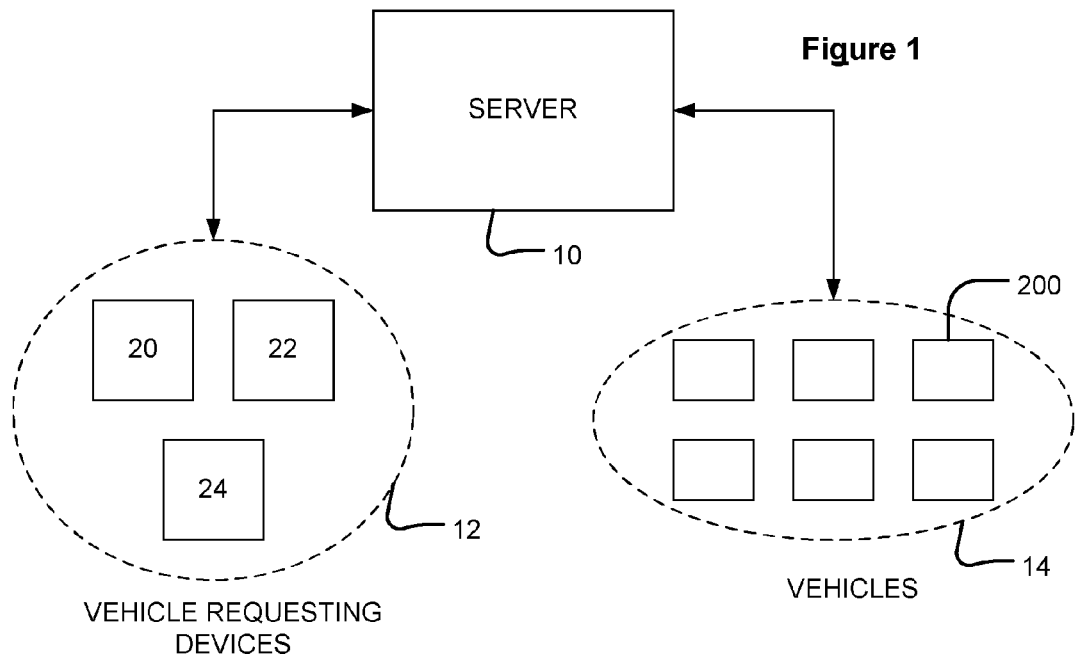
FIG. 1 is an illustration of the structure of a vehicle request management system in accordance with the present invention.

As shown in FIG. 1, the system comprises three principal components: a server 10; a plurality of vehicle requesting devices 12; and a plurality of vehicles 14, each being equipped with a device 200 having route planning and navigation functionality.

Figure 2:
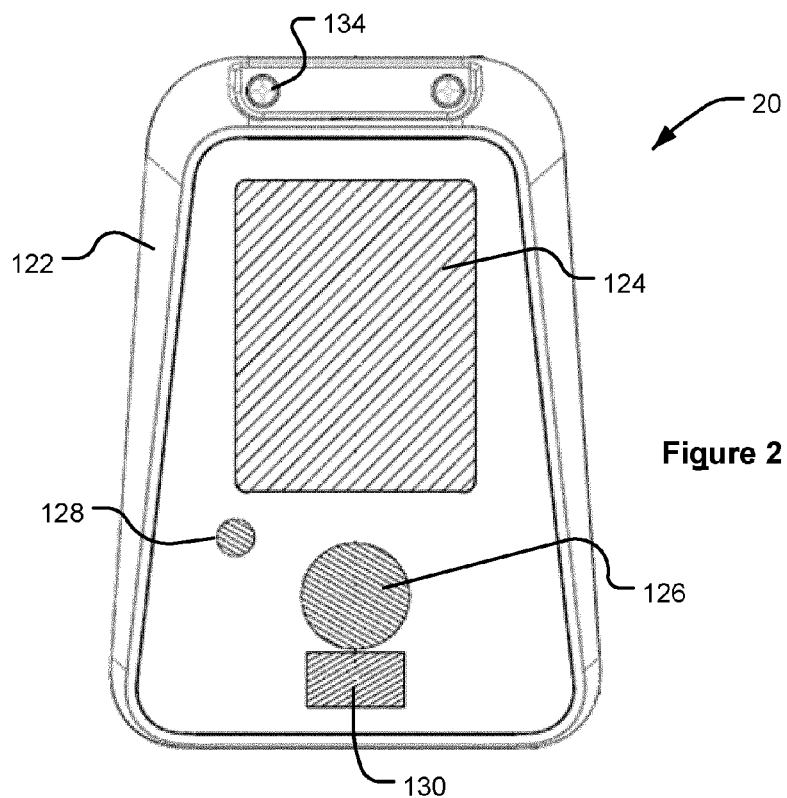
FIGS. 2 and 3 show an exemplary fixed location device that can be used as a vehicle requesting device in the system.
Figure 3:
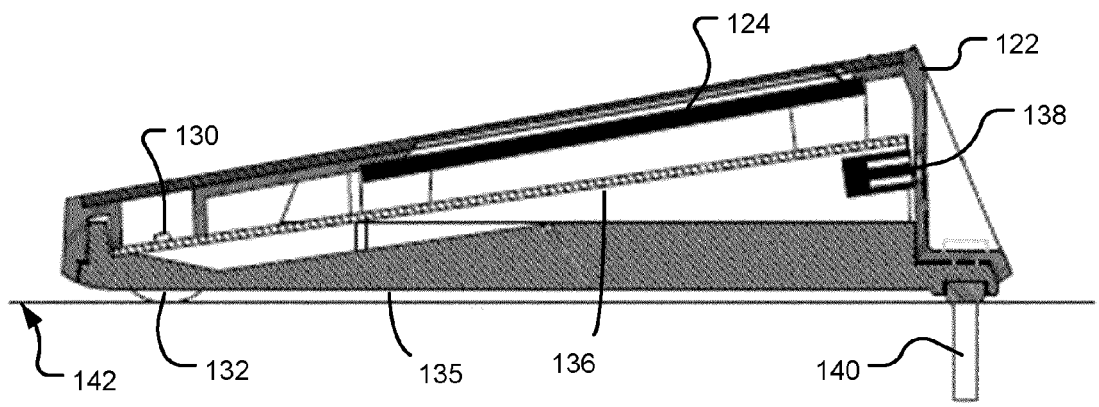

The vehicle requesting devices 12 can be of a number of different forms. For example, the vehicle requesting device could take the form of a fixed location device 20, as shown in FIGS. 2 and 3. A fixed location device, as the name suggests, is associated with only a single location and can only be used to request vehicles to this location. The vehicle requesting device can also take the form of a mobile device 22, such as a mobile telephone. Such mobile devices, as will be discussed in more detail below, are capable of determining their own location and can be used to request a vehicle to their current location, or any other location as desired. The vehicle requesting device can also be a computing resource 24, such as a desktop or portable personal computer, that does not have means for determining its own location, but nevertheless can still be used to request a vehicle pick-up at a particular location.

Each of the vehicle requesting devices 12 can be used by a user to send a request for a vehicle, such as a taxi, to the server 10. The request will typically include a pick-up location, or data that can be used to derive such a location, and may also include at least one of: a pick-up time; a drop-off location; a desired vehicle type or size (e.g. car, minivan, limousine, etc); the number of passengers to be picked-up; and any additional preferences, such as the need for a child seat, the need for disabled access or if a particular driver is desired. The vehicle requests can be transmitted to the server 10 using any suitable communication means, such as the mobile telecommunication network, the Internet, etc.

When a vehicle request is received at the server 10, the server will select a suitable vehicle 14 that meets the criteria set out in the request. The server 10 therefore functions as a dispatching system to dispatch a suitable vehicle based on the user's request.

Figure 4:
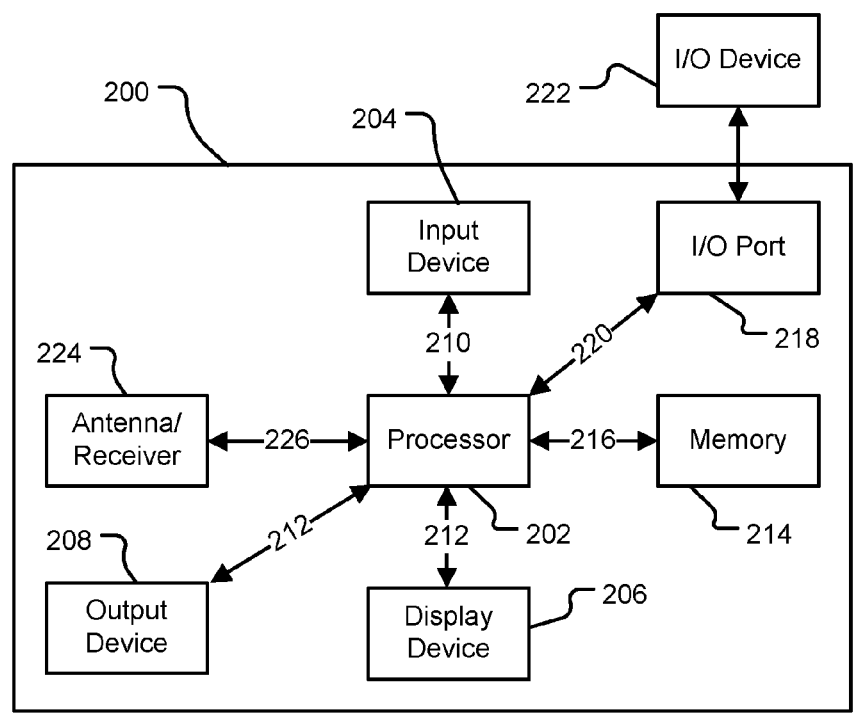
FIG. 4 is a schematic illustration of electronic components arranged to provide a navigation device associated with a vehicle in the system.

The vehicles 14 are each equipped with a device 200 comprising a location determining means and a communication means for communicating with the server 10. The devices in the vehicles can be of any suitable form, but in illustrative embodiments are navigation apparatus. The navigation apparatus can be portable navigation devices (PNDs), which can be removably mounted in the vehicle, or a navigation device that is built into the vehicle. An illustrative representation of a navigation device 200 that can be positioned in one of the vehicles 14 is shown in FIG. 4.

The vehicle devices each transmit their current location, and thus the location of the vehicle, to the server 10 at regular intervals. The server 10 therefore knows the current position of all vehicles within the system at any moment in time, at least to a reasonable degree of accuracy. The server is also aware of the current availability of a vehicle, e.g. whether a vehicle is already in the process of completing a request and whether the driver of the vehicle is unavailable for any other reason. In this regard, each driver may be able to input a range of times at which their vehicle is available to receive requests. Alternatively, the driver can just activate or deactivate the device as desired. The driver may also input certain locations or areas where they will or will not operate.

The server 10 can select a vehicle 14 in response to a particular request, and thus form a temporary association between the requesting device 12 and the device 200 in the vehicle, according to one or more of the following systems:

a bidding system; a rating-based system; and an automatic dispatching system. It will be understood, however, that any selection method or combination of selection methods could be used as desired at the server 10 to match a vehicle with a received request.

In a bidding system, each driver that is able to fulfil a vehicle request, is offered the opportunity to bid for a job. The bidding system can be a flower bid system wherein the job is offered to a plurality of drivers at a starting price that reduces over time until one driver accepts. Alternatively, the bidding system can be an auction bid system wherein each driver keeps bidding, and the highest bidder is awarded the job.

In a rating-based system, each driver is awarded a particular rating, e.g. based on previous customer reviews, and the customer request can include a desired driver rating that must be met. The job is accordingly only offered to those drivers with a rating equal to or better than the requested rating.

Meanwhile, in an automatic dispatching system, the server 10 assigns the vehicle request to a particular vehicle 14 based on one or more criteria, e.g. to minimise any waiting time by the vehicle based on their predicted arrival time at the requested location. The criteria can include, for example, the closest vehicle in terms of distance and/or time. This allows jobs to be assigned in an efficient manner, e.g. reducing mileage, fuel consumption, maintenance costs, fuel-related taxes, etc, of the vehicles. As will be appreciated, a driver may refuse a job, e.g. through a suitable user-input on their navigation device, even if they are selected by the server 10 as the most suitable.

Once a job has been given to a vehicle, and then accepted by the driver of the vehicle, and in some circumstances also accepted by the user who made the request, then an association is made between the requesting device and the navigation device in the vehicle. This association allows data to be exchanged between the two devices, until such a time as the association is broken, e.g. when the trip has been completed and a payment made.

Once a vehicle has won a job, details of the job are sent to the vehicle's navigation device 200. The details will include the pick-up location, and may also include the details of the person who made the request. The navigation device can automatically, or upon an input by the driver, calculate a route from the vehicle's current position to the pick-up location, and begin guiding the driver to the location. Alternatively, if the vehicle is currently finishing a job, the pick-up location can be temporarily stored in memory until it is needed, or a route can be calculated to the pick-up location using the drop-off location for the current job as a waypoint. Following the calculation of a route, an estimated time of arrival (ETA) at the pick-up location is generated, and this can be supplied to the requesting device 12. An updated ETA can be sent to the requesting device 12 whenever needed, e.g. if the ETA changes as the vehicle travels the calculated route.

The server 10 and the navigation device 200 of the vehicle 14 each have, or have access to, the same digital map data that can be used for route calculation. The map data can include, or be supplemented, with historical and/or current traffic information, weather information, the presence of taxi-lanes or other information that may impact the optimum route and/or estimated time of arrival. Accordingly, the server 10 is aware of the route that will be calculated at the navigation device 200 of the vehicle, and can, for example, determine if the vehicle is deviating from the route that it should be following. If the server 10 identifies such a deviation, it may alert the passenger or another third party, or it may reduce the rating of the driver accordingly. The server 10 may also pass the request to another vehicle if the original vehicle is still heading away from the pick-up location. As there may be valid reasons for this deviation, which are not included in the digital map data available to the server, e.g. closed roads, accidents, road works, etc, in preferred embodiments, the deviation determination algorithm at the server 10 compares the actual time of arrival of the vehicle at the destination with the estimated time of arrival, and reduces the driver's rating only if the actual time is greater than the estimated time by more than a predetermined amount.

Upon picking up the user at the pick-up location, the navigation device 200 of the vehicle 14 will guide the driver to the desired drop-off location. The drop-off location could have been provided by the user in the original vehicle request, or it may be given to the driver by the passenger upon pick-up. Upon arrival at the drop-off location, the passenger will pay for the trip. The payment could be made using cash or by using a credit or debit card, however, preferably the passenger will have an account on the server 10 to which the trip can be assigned thereby allowing payment to be made electronically.

One form that the vehicle requesting devices 12 can take is a fixed location device 20. An example of a fixed location device is shown in FIGS. 2 and 3.

The fixed location device 20 is arranged to be positioned within a building or outdoor meeting point, such as a hotel, bar, restaurant, shopping mall, train station or the like, and be associated with a single pick-up location. The pick-up location may be the device's actual location, or it may be a location in the vicinity of the device, such as the street entrance of the hotel or bar, or the nearest point on the street where a taxi can safely stop.

The fixed location device 20 is configured to allow multiple vehicle requests to the pick-up location associated with the device to be placed, and have more than one of these requests pending at any one time. As shown in FIG. 2, the device 20 has a first button 126 by means of which a user can make a vehicle request. In an embodiment, the button must be pressed for a predetermined period of time, such as 1 second, before a request is triggered. The device 20 also has a second button 128 by means of which a previously made vehicle request can be cancelled. Within a casing 122 of the device 20 is a means for communicating with the server 10. This will typically be a mobile telecommunications module, such as a GSM or GPRS. Additionally, or alternatively, the device 20 may contain a WiFi module, e.g. for areas with limited mobile telecommunications coverage. Such modules are preferably located on a printed circuit board (PCB) 136 within the casing 122 (as shown in FIG. 3). The device 20 may also have a physical connection to the Internet, however, such an arrangement limits where the device 20 can be positioned.

The device 20 has a connection to an external power source 138, but it will be understood that the device 20 may additionally or alternatively have a battery or other internal power source.

The device 20 further comprises an output means, such as a LED or other similar light emitting device 130, and/or a speaker, which in preferred embodiments is used to indicate when a vehicle is within a predetermined distance of the pick-up location or has arrived at the pick-up location.

When the button 126 is pressed, a vehicle request is transmitted to the server 10 containing a reference number associated with the device 20. The server 10 has a list of reference numbers, one for each of the fixed location devices in the system, and a pick-up location associated with each reference number. This limits the amount of data that needs to be contained in the transmitted vehicle request, and also allows the pick-up location associated with a device 20 to be easily changed.

The device 20 has an associated display 124, which is used to display a message for each pending request; the message indicating the current status of the request. The display 124 may be located within the casing 22 of the device 20, as is shown in FIG. 2. In other embodiments, however, the display 124 may be separate from the device, e.g. positioned on a nearby wall. For example, the message can initially say that a request has been placed. It is then changed to say that a vehicle has accepted the request and is en-route to the pick-up location. This message may also include details of the vehicle, the driver and/or the ETA at the pick-up location. The message can then change to indicate that the vehicle has arrived at the pick-up location.

A message is removed from the display when an indication is received from the server 10 that the vehicle associated with the request has left the pick-up location. This determination can be made automatically at the server 10, e.g. by determining that the vehicle has stopped within an area containing the pick-up location for a predetermined period of time and has then moved outside of the area (as will be discussed in more detail below). Alternatively, the driver of the vehicle can indicate on their navigation device 200 that they are leaving the pick-up location, and this indication can be transmitted via the server 10 to the device 20.

The device 20 is arranged is to affixed to a flat surface 142, such as a table, bar area or wall. The device 20 therefore has openings 134 through which screws 140 can be placed to fix the device to the surface 142. The base 135 of the device 20 also has support features, such as rubber feet 132, to aid in securing the device at a single location and preventing the device 20 from moving on a wet surface as may often be found in an environment such as a bar or restaurant. For this reason, the casing 122 of the device will typically be water resistant.

Another form that the vehicle requesting device 12 can take is a mobile device 22, such as a mobile telephone, tablet computer, portable digital assistant (PDA).

The mobile device 22 is located within a housing that includes a processor connected to an input device and a display screen. The input device can include a keyboard device, voice input device, touch panel and/or any other known input device utilised to input information; and the display screen can include any type of display screen, such as an LCD display. In a particularly preferred arrangement, the input device and display screen are integrated into an integrated input and display device, including a touchpad or touchscreen input so that a user need only touch a portion of the display screen to select one of a plurality of display choices or to activate one of a plurality of virtual buttons.

The mobile device 22 has a location determination means, which is capable of determining the current location of the device 22. In a preferred embodiment, the location determination means is a global navigation satellite system (GNSS) receiver, such as a GPS receiver, that receives and processes satellite broadcast signals, including location data, to determine a current location of the device.

A software application runs on a processor of the mobile device 22 that allows a user to create a vehicle request, and to send this vehicle request to the server 10. The vehicle request is sent to the server 10 using a wireless communications module, such as a GSM or GPRS module. The vehicle request will include a pick-up location, which may be the current location of the mobile device 22 (obtained from the GNSS receiver) or can be a location input by the user on the input device. The vehicle request may also include a drop-off location, which again can be selected by the user on the input device, and may also include a pick-up time. The pick-up time can be an indication that a taxi is required as soon as possible, or it may be a specific future time that is input by the user on the input device.

As described above, once the vehicle request from the mobile device 22 is received at the server 10, a vehicle 14 is selected that meets the criteria in the request. A temporary association is then formed between the two devices at the server 10, i.e. such that the two devices will be linked on the system until the requested journey has been completed. The server 10 will transmit details of the selected vehicle 14 to the mobile device 22. The details can include: information about the vehicle, such as model, colour, registration number, etc; information about the driver, such as a picture, name, telephone number, etc; and information about the current position of the vehicle and/or the route that the vehicle will travel to the pick-up location and/or the estimated time of arrival at the pick-up location. The server 10 may continually send the position of the selected vehicle 14 to the mobile device 22, such that the user can see the progress of the vehicle as it travels to the pick-up location.

The user may include a preferred driver or set of drivers that they would like for their requested journey in the request that is transmitted to the server 10. Alternatively, a user may have a one or more preferred drivers associated with a profile stored on the server 10. The server 10 takes account of the preferred driver or drivers when selecting the vehicle to complete the request.

The arrival of the vehicle 14 at the pick-up location is transmitted to the mobile device 22, and an suitable alert is provided to the user. The alert may be a visual alert on the display screen of the device, an audible alert, a haptic alert, or any combination thereof. The arrival of the vehicle at the pick-up location may be automatically determined by the server 10, e.g. as discussed in more detail below. Alternatively, the vehicle's arrival may be determined when the driver provides an indication on their navigation apparatus 200. In addition to providing such an alert, an indication may be provided on the mobile device 22 as to the current position of the vehicle 14 at the pick-up location. The indication can be, for example, a directional pointer or arrow that points towards the current location of the vehicle 14, as received from the server 10, from the current location of the mobile device 22. This pointer could generated using any suitable means within the mobile device 22, such as one or more of a compass, gyroscope and accelerometers. The use of such a pointer or arrow allows a user to identify his or her vehicle 14 even when, for example, it is parked on the street next to a number of other taxis, and thus be difficult for the user to identify.

When the user has found and entered the selected vehicle 14, the driver of the vehicle may immediately start travelling towards the drop-off location, if it was already known from the original vehicle request. Alternatively, the user may simply inform the driver directly of the drop-off location, and then the driver may input the destination into their navigation apparatus 200. In other embodiments, and due to the temporary association that is formed at the server 10 between the two devices, the user may input a desired drop-off location on their mobile device 22 and transmit this destination to the navigation device 200 of the vehicle. The user may even do this after providing the driver with an approximate destination so that the driver can begin the journey before a final drop-off location has been provided. As will be understood, this functionality also would allow the user to modify the drop-off destination en-route should this be desired.

During the journey from the pick-up location to the drop-off location, the user may be able to see on the display of their mobile device 22, a representation of the route that is being travelled by the vehicle together with the current position of the navigation apparatus, and thus the vehicle. The route information and position of the vehicle will be received from the server 10. The user is therefore able to see if the driver is travelling along the optimum route that has been determined by the navigation apparatus. Should the driver deviate from this route, then this can be seen by the user and they can enquire with the driver, if needed, as to the reason for the deviation. The software application running on the mobile device may also include a means by which the user can send an alert to the server 10 or to another third party if they feel uncomfortable in the vehicle in which they are travelling. This alert could be automatically generated at the server 10 by determining if the driver has deviated from the planned route by more than a predetermined amount, e.g. if more than a predefined number of navigation instructions are ignored by the driver or the vehicle is a predefined distance away from the calculated route. The user may be asked to confirm any automatically generated alert on their mobile device 22 before it is sent.

The payment for the journey may be made automatically, for example, by the user setting up an account on the server 10 having a certain amount of money associated with it. The cost of the journey may simply be deducted from the user's account. This may happen automatically, or upon confirmation from the driver and/or user on their respective devices as to the amount of money to be paid.

At the end of the journey, the user can also use their mobile device 22 to provide a rating of the journey and/or of the driver. This rating will be transmitted to the server 10 and associated with the relevant driver's details held at the server 10. The driver's rating can, as discussed above, be used by the user and/or server 10 when selecting a vehicle to complete a vehicle request. The rating associated with a driver may also be automatically reduced if the server 10 determines that the driver did not follow the calculated optimum route, and as a result caused the user's journey to be longer than necessary, either in terms of time and/or distance.

FIG. 4 is an illustrative representation of a navigation device 200 that can be positioned in one of the vehicles 14. The navigation device 200 is shown in block format. It should be noted that the block diagram of the navigation device 200 is not inclusive of all components of the navigation device, but is only representative of many example components. The navigation device 200 is described in the following paragraphs as being a portable navigation device (PND) that can be removable mounted in a vehicle. It will be understood, however, that the navigation device 200 could in other embodiments be built into the vehicle.

The navigation device 200 will typically comprise digital map data having a plurality of navigable segments representing segments of a navigable route in a geographical area covered by the map. The digital map data is used by the navigation device 200 to calculate routes between locations that can be traversed by the vehicle carrying the navigation device, and to provide suitable navigation instructions to driver to guide him or her along the calculated route.

The navigation device 200 is location within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 4 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 4 are powered by power sources (not shown) in a conventional manner. As will be understood by one of ordinary skill in the art, different configurations of the components shown in FIG. 4 are considered to be within the scope of the present application. For example, the components shown in FIG. 4 may be in communication with one another via wired and/or wireless connections and the like. Thus, the scope of the navigation device 200 of the present application includes a portable or handheld navigation device 200.

In addition, the portable or handheld navigation device 200 of FIG. 4 can be connected or "docked" in a known manner to a vehicle such as a bicycle, a motorbike, a car or a boat for example. Such a navigation device 200 is then removable from the docked location for portable or handheld navigation use.

Figure 5:
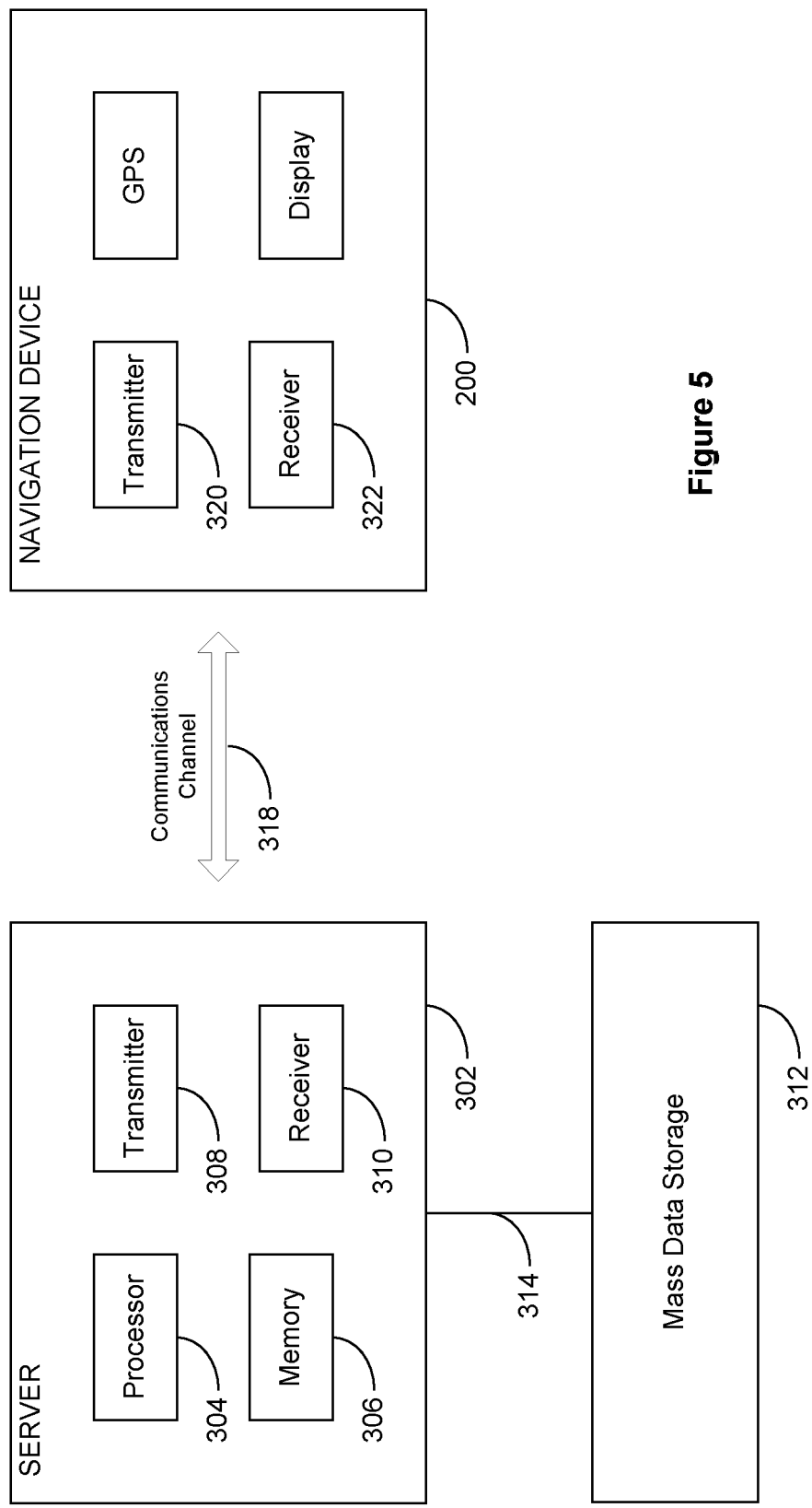
FIG. 5 is a schematic illustration of the manner in which a navigation device may receive information over a wireless communication channel.

Referring now to FIG. 5, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc; model/manufacturer specific settings may be stored on the navigation device 200, for example. The data stored for this information can be updated.

In FIG. 5 the navigation device 200 is depicted as being in communication with the server 302 via a generic communications channel 318 that can be implemented by any of a number of different arrangements.

The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 4, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

Figure 6:
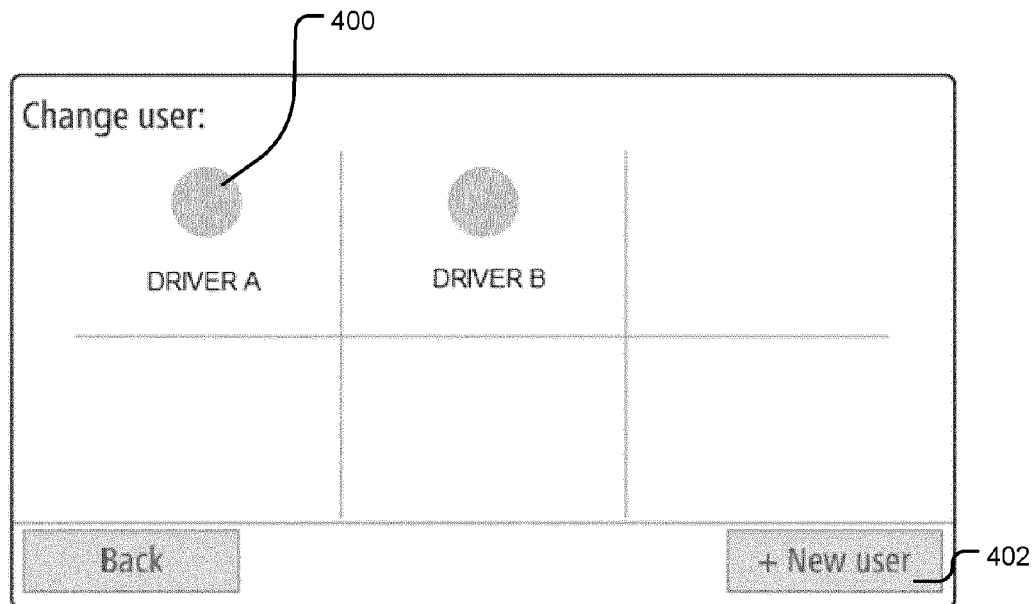
FIGS. 6 to 15 are exemplary display screens on a navigation device used in the system.

In preferred embodiments, the navigation device 200 is arranged to store a number of user profiles, such that the same device can be used by a number of different people. This is beneficial when the navigation device 200 is used within a taxi or other similar vehicle, which will often be shared between a number of different drivers. When a particular user logs onto the device, e.g. by touching the "Driver A" icon 400 or by entering his or her details using the "new user" icon 402 (as shown in FIG. 6), an indication of this selection is sent to the server 10, such that the server can associate the driver with the vehicle. The correct driver details and/or rating can accordingly be supplied to a user when the vehicle is selected to complete a submitted vehicle request from the user.

When a vehicle request is received at the server 10, one or more suitable vehicles 14 are selected and the request is transmitted to the navigation device 200 within the or each vehicle. An exemplary screen that is shown on the navigation device 200 can be seen in FIG. 7. In this instance, the vehicle request 404 relates to a person that is asking for a vehicle as soon as possible at a location in the centre of the city of Amsterdam.

Figure 7:
Figure 8:
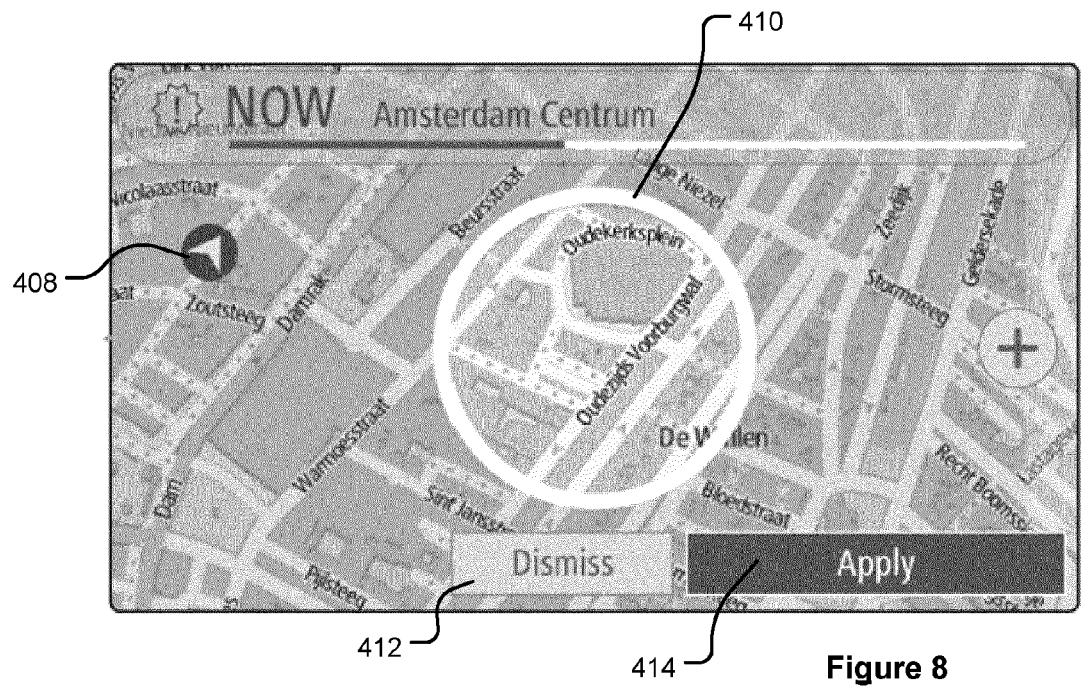

In the lower left hand corner of the screen of FIG. 7 is a selected icon marked "Break" 406. The driver can touch this icon at any time to indicate they are not available to take requests at the current time. As will be appreciated, when the icon 406 is touched, then an indication is transmitted to the server 10 from the navigation device 200 to notify the system that the vehicle is not currently available.

If the driver should touch the vehicle request message 404, then the navigation device pans the displayed map such that it is centred at the pick-up location associated with the request. The pick-up location is highlighted on the screen, e.g. by a circle 410 and/or by fading or greying the other portions of the map display, such that the driver can quickly identify the pick-up location. The current position of the vehicle 408 is also shown on the screen, again to aid the driver in identifying the pick-up location. If the driver wishes to apply for the vehicle request, then they can touch the icon 414. Alternatively, if the driver wishes to decline the vehicle request, then they can touch the icon 412.

Figure 9:
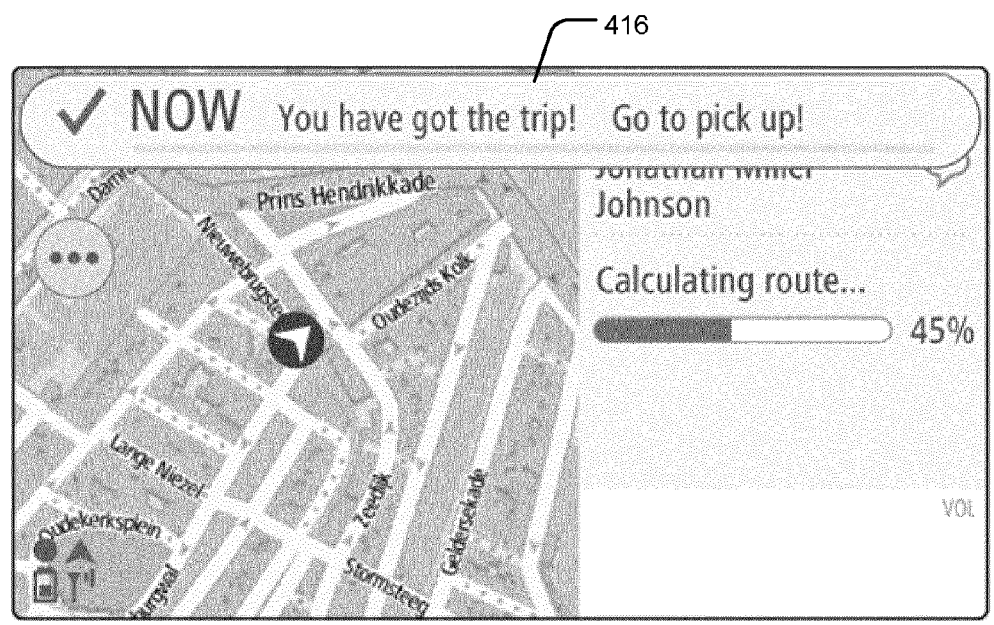
Figure 10:
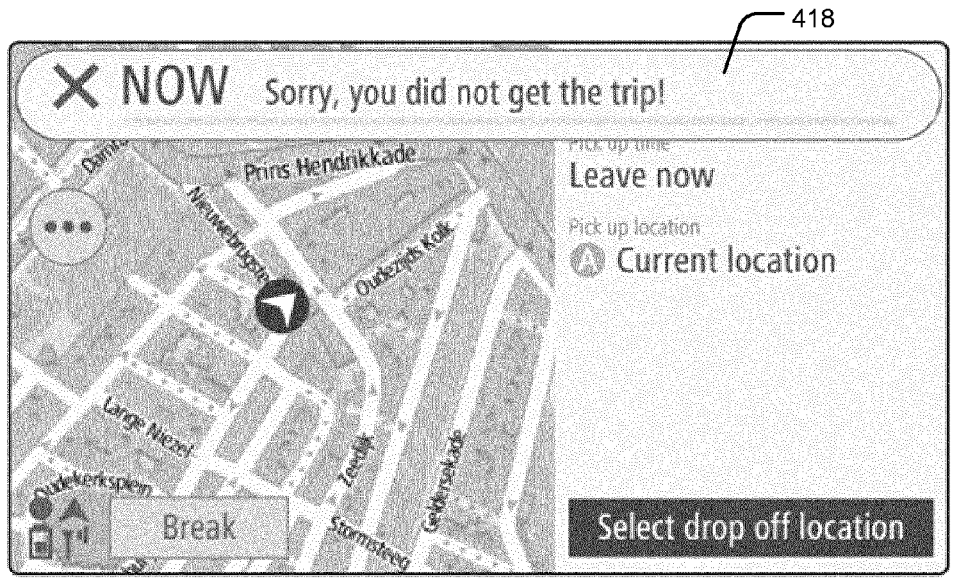

If the driver applies for the vehicle request 404, then they will either win the request as shown in FIG. 9 or lose the request as shown in FIG. 10.

Figure 11:
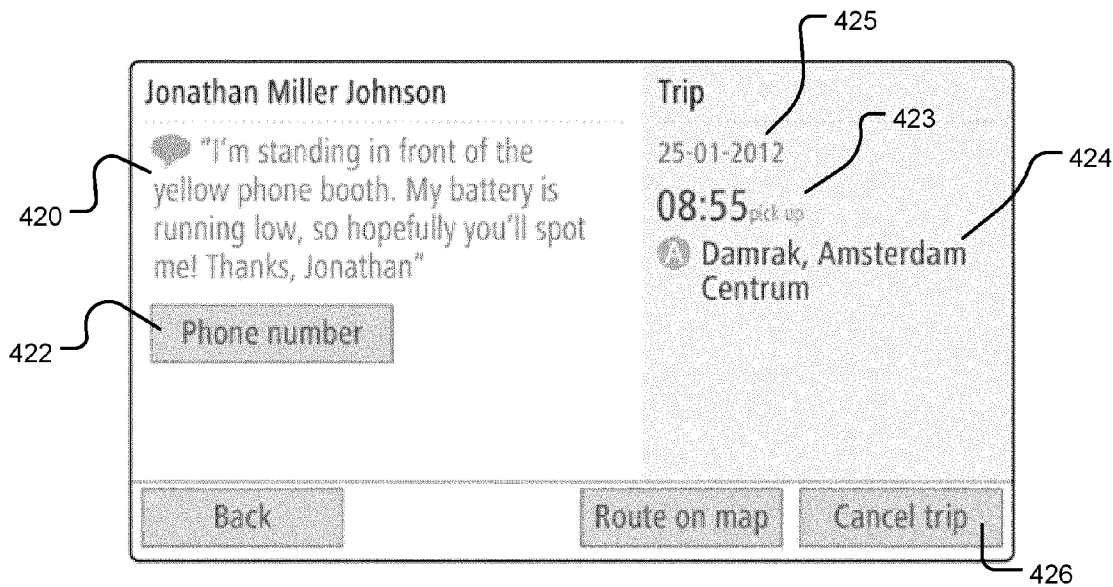

If the driver wins the request, then full details of the vehicle request will be sent by the server 10 to the navigation device 200. For example, for the vehicle request in question, and as shown in FIG. 11, the request has been submitted by or on behalf of a Jonathan Miller Johnson. The details of the request will include at least the pick-up location (A) 424; in this case the Damrak in the centre of Amsterdam. The driver will also see the date of the request —425 and an estimated time of arrival at the pick-up location —423. The ETA at the pick-up location is determined by the navigation device 200 planning a route from the current location of the vehicle to the pick-up location, which in preferred embodiments takes account of historic, current and/or estimated future traffic conditions. As shown in FIG. 11, the request may also include a message from the user indicating where they are currently located, e.g. "I'm standing in front of the yellow phone booth", and an icon 422 that allows the driver to contact the user.

The trip details screen shown in FIG. 11 can be accessed at any time throughout a journey by the driver, and the information contained therein will be updated to reflect the current status of the journey. For example, when the user has been picked up at location A and has provided a destination location to the driver, then the screen will also include details of this location and an associated ETA. The trip details screen can also be used by the driver to cancel a trip that they had previously accepted. This can be done by selecting the "cancel trip" icon 426, and a suitable message will be sent to the server 10. The message may include a reason for the cancellation, such as traffic, the vehicle being in an accident or the vehicle breaking down. Upon receipt of such a cancellation, appropriate action can be taken at the server 10, such as sending another vehicle to the pick-up location and notifying the user accordingly, or, in the case that the current vehicle has broken down, sending another vehicle to location of the current vehicle. The rating of a driver could be automatically decreased by a certain amount if a trip is cancelled without a valid reason.

Figure 12:
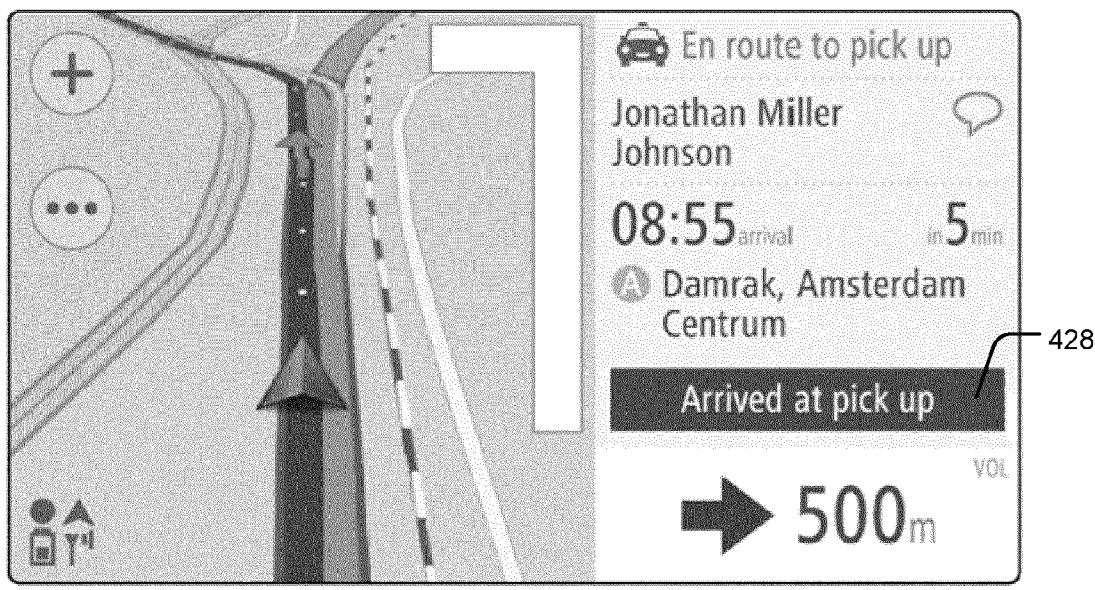

Once a trip is accepted and/or won by a driver, the navigation device 200 will automatically calculate a route to the pick-up location and provide guidance to the driver. This is shown, for example, in FIG. 12. The arrival of the vehicle at the pick-up location can be indicated by the driver selecting the "arrived at pick up" icon 428, again as shown in FIG. 12. It is also contemplated, however, that the arrival of the vehicle at the pick-up location may be determined automatically at the server 10, and a message indicative thereof being sent to the navigation device 200. The manner by which the server 10 can automatically detect the arrival and/or departure of a vehicle from a particular location will be described in more detail below.

Figure 13:
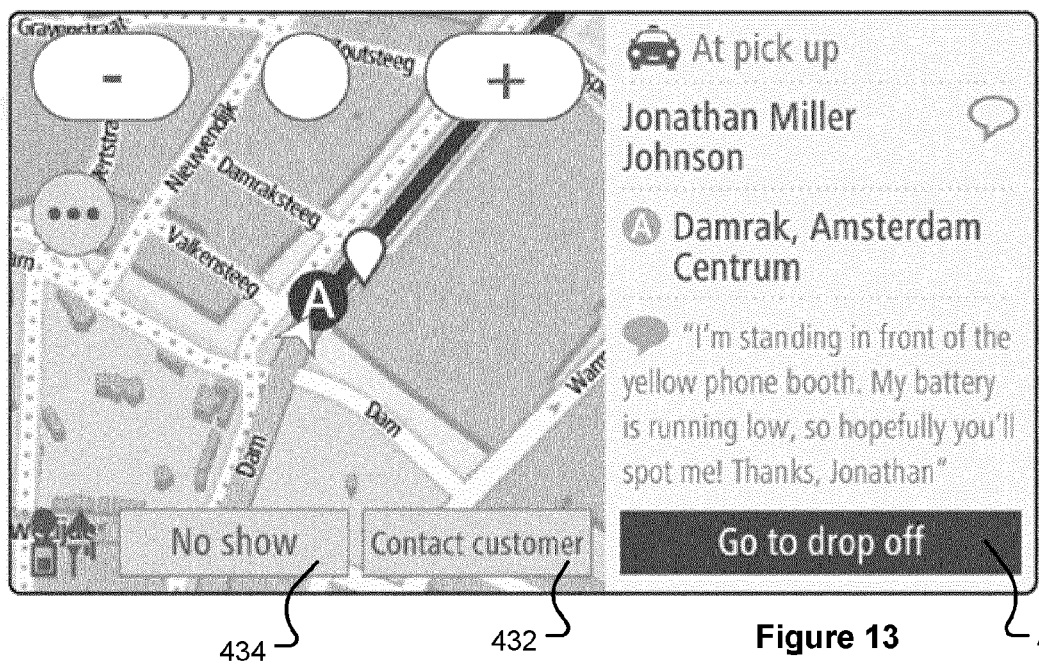

When the vehicle reaches the pick-up location (A), the navigation device 200 will display the screen shown in FIG. 13. The user will, at this point, get into the vehicle and if a drop-off location has not yet been provided, i.e. in the original vehicle request, then the driver will ask the user for the drop-off location. This may be input by the driver on the navigation device 200, or it may be provided by the user on the requesting device, e.g. mobile device 22. Once a drop-off location has been provided, then the driver can select the "go to drop off" icon 430 (as shown in FIG. 13), and the navigation device 200 will calculate a route from the pick-up location (A) to the drop-off location (B) and provide navigational guidance to the driver.

As shown in FIG. 13, if the driver and user are not able to immediately locate each other when the vehicle reaches the pick-up location, the driver can attempt to contact the user using the "contact customer" icon 432. If the driver is still not able to locate the user, then they can select the "no show" icon 434, whereupon a suitable message is sent to the server 10. The server 10 may decrease a rating of the user associated with their account following such an event. This prevents a user from abusing the system and continually making invalid vehicle requests.

Figure 14:

As the driver is guided to the drop-off location, a screen such as that shown in FIG. 14 will be displayed on the navigation device 200. As with the arrival at the pick-up location, the arrival of the vehicle at the drop-off location can be indicated by the driver selecting the "arrived at drop off" icon 436, as shown in FIG. 14. It is again contemplated, however, that the arrival of the vehicle at the drop-off location may be determined automatically at the server 10, and a message indicative thereof being sent to the navigation device 200.

Figure 15:
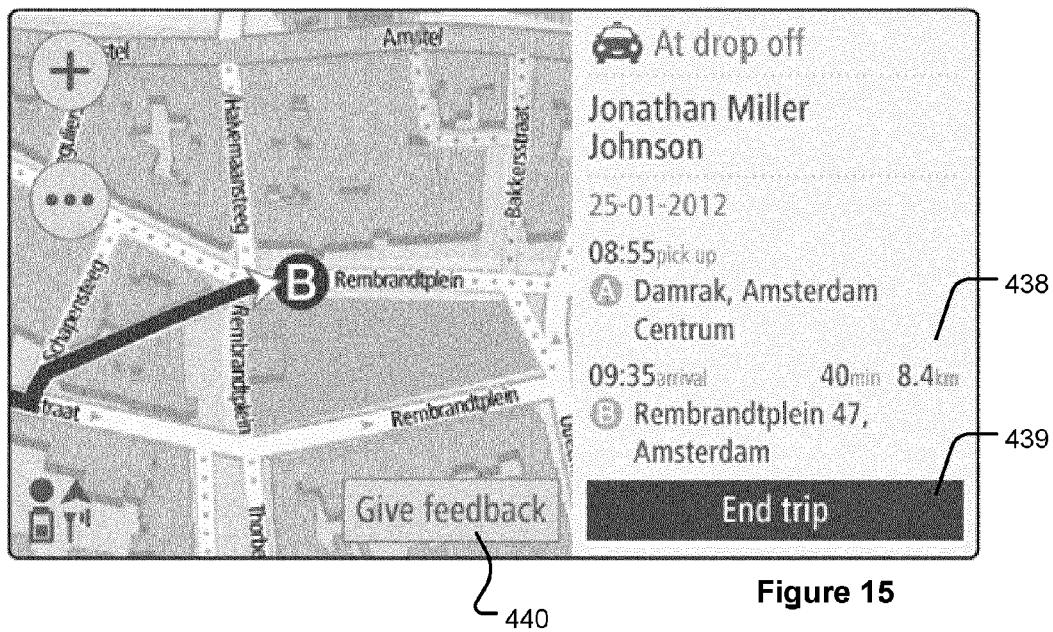

When the vehicle reaches the drop-off location (B), the navigation device 200 will display the screen shown in FIG. 15. From this screen, the driver can see a summary of the completed journey 438, including the journey time and distance. The driver can end the journey by selecting the "end trip" icon 439, which can cause a message to be sent by the server 10 to a mobile device 22 of the user to confirm payment for the journey. The driver can also select the "give feedback" icon 440 to provide information about the journey and/or the user. For example, the driver can indicate that they do not wish to receive further vehicle requests form the user.

Figure 16:
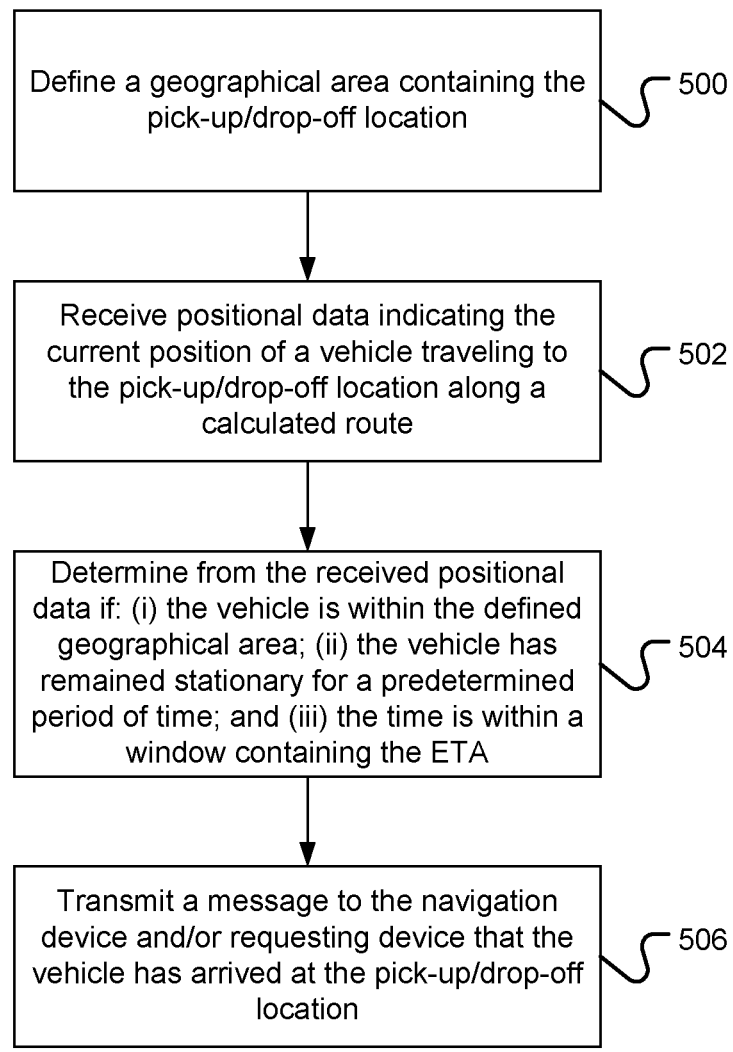
FIG. 16 illustrates the steps of a method of automatically determining the arrival of a vehicle at a pick-up or drop-off location.

The manner by which the server 10 can automatically determine the arrival of a vehicle at a pick-up or drop-off location will now be described with reference to FIG. 16.

The server 10 defines a geographical area containing the pick-up or drop-off location —500. Typically, this area is a circle of radius 250*m* centred at the location. The positional data relating to the vehicle travelling to the location can then analysed to determine if the vehicle has slowed down and stopped for a predetermined period of time within the defined area and has stopped at a moment in time that is within a time window containing the estimated time of arrival associated with the calculated route —504. By utilising the ETA of the calculated route in the arrival detection algorithm, a chances of mistakenly determining that the vehicle has arrived at a location when in fact the vehicle is, for example, stopped at traffic lights on an adjacent road, are substantially reduced.

In the above description, it is assumed that the user will have made a request for a vehicle using one of the described vehicle requesting devices 12 and that they will enter the vehicle when it arrives at the requested pick-up location. In this scenario, the transmission of the vehicle request results in a temporary association being formed at the server 10 between the vehicle requesting device 12 and the vehicle 14. This temporary association can then be used to provide many of the benefits associated with the present invention, such as electronic payment, modifying the drop-off location en-route, rating the driver and/or passenger, and the passenger viewing the route that should be travelled by the vehicle. It will be understood, however, that if a user hails a nearby passing vehicle, then no such temporary association will be made even if both the user and the vehicle are part of the vehicle request management system of the present invention.

Figure 17:
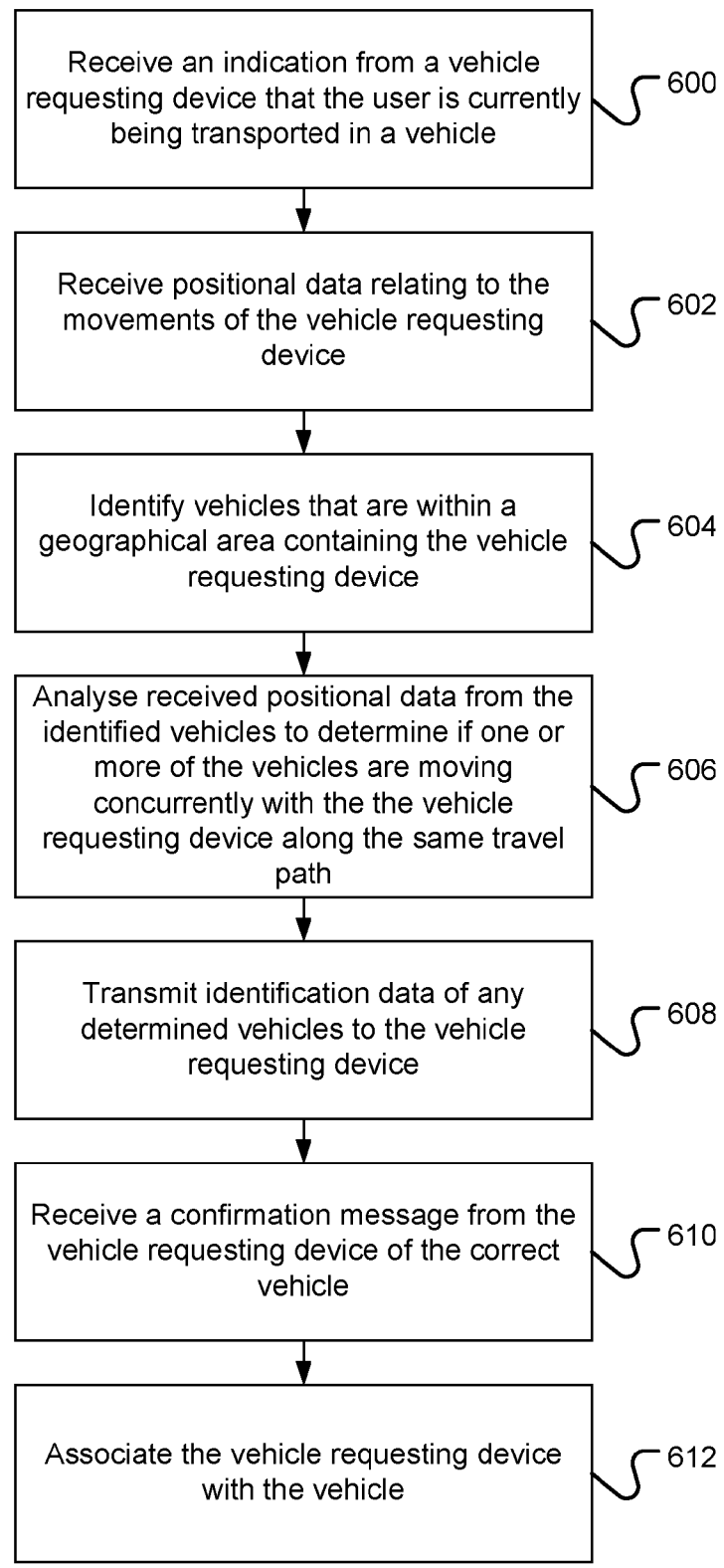
FIG. 17 illustrates the steps of a method of forming an association between a mobile device carried by a user and navigation device in a vehicle.

This problem can be overcome by using the method illustrated in FIG. 17.

When a user hails a passing taxi, they can send an indication to the server 10 using their mobile device 22 that they have or are about to enter a vehicle 14-600. This indication can be generated, for example, simply by opening the appropriate software application on their mobile device 22. Using the positional data that is sent to the server 10 from the mobile device 22, and which is indicative if the position and movements of the mobile device 22, the server 10 can identify those vehicles that are within a predefined geographic area containing the mobile device 22. This area may be circle, e.g. having a radius of about 30 meters, centred at the current location of the mobile device 22-604. Once any such vehicles have been identified, then a comparison can be made at the server 10 between the positional data received from the mobile device 22 and the positional data of the identified vehicles to determine if any of the vehicles are moving concurrently with the mobile device 22 along the same travel path. Such concurrent movement can be indicated by similar speeds, accelerations, directional changes, and the like. If only a single vehicle is identified as moving concurrently with the mobile device 22, then it can be inferred that this must be the vehicle in which the user is currently travelled and the server 10 forms associates the mobile device 22 with the navigation apparatus 200 within the vehicle. Alternatively, if a plurality of candidate vehicles are identified, then a list of the vehicles with suitable identification information, e.g. details of the vehicle and/or driver, are sent by the server 10 to the mobile device 22-608. The user can then select the appropriate vehicle from the list on the mobile device 22, and this selection can then be transmitted back to the server 10-610. The server 10 will then associate the mobile device 22 with the navigation device 200 within the selected vehicle —612.

It will appreciated that whilst various aspects and embodiments of the present invention have heretofore been described, the scope of the present invention is limited to the particular arrangements set out herein and instead extends to encompass all arrangements, and modifications and alterations thereto. For example, whilst the embodiments described in the foregoing description refer to GPS, it should be noted that the devices may utilise any kind of position sensing technology as an alternative to, or indeed in addition to, GPS. For example, the devices may utilise other global navigation satellite systems, such as the European Galileo system. Equally, it is not limited to satellite-based systems, but could readily function using ground-based beacons or other kind of system that enables the device to determine its geographic location.

It will also be understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A vehicle request device for requesting a plurality of vehicles by multiple users to a location associated with the device, the device comprising:
   at least one processor:
   an input device arranged to cause the at least one processor to generate a vehicle request for each one of multiple users upon receipt of a user input by each one of said multiple users; and
   a communications device for communicating with a remote device, said communications device being arranged to transmit the generated vehicle requests to the remote device, said vehicle requests comprising data indicative of the location associated with the vehicle request device, and said communications device being further arranged to receive information from the remote device relating to the status of each transmitted vehicle request;
   wherein said vehicle request device is arranged, for each vehicle request, to generate a message indicative of the status of the vehicle request using the received information and to simultaneously display a plurality of generated messages, each generated message relating to a vehicle request, on a display; and
   wherein said communications device is further arranged to receive an indication from the remote device that a vehicle that has accepted a vehicle request has departed from the location associated with the vehicle request device, said vehicle request device being arranged to stop updating the status of a pending vehicle request and stop displaying on the display the message associated with said pending vehicle request on receipt of said indication.

2. The vehicle request device of claim 1, wherein the location associated with the device is time-dependent.

3. The vehicle request device of claim 1, further comprising a location determining device, and wherein the location associated with the device is the location output by the location determining device.

4. The vehicle request device of claim 1, comprising an input device arranged to cause the at least one processor to cancel a previously made vehicle request upon receipt of a user input.

5. The vehicle request device of claim 1, wherein the information received from the remote device comprises at least one of: an indication that a vehicle request has been at least one of submitted and accepted by a vehicle; information relating to the driver of a vehicle that has accepted the vehicle request; information relating to a vehicle that has accepted the vehicle request; an estimated time of arrival of a vehicle at the location; and the current location of a vehicle that has accepted the vehicle request.

6. The vehicle request device of claim 1, wherein the display is integral with the device.

7. The vehicle request device of claim 1, wherein the content of a message being displayed varies over time in dependence on the status of the vehicle request.

8. The vehicle request device of claim 7, wherein the generated message comprises at least one of: a text string or icon representative of the status of the vehicle request; details of the driver of a vehicle that has accepted the vehicle request; details of a vehicle that has accepted the vehicle request; and an estimated time of arrival of a vehicle at the location.

9. The vehicle request device of claim 1, wherein the device is further arranged to cause an output device to provide at least one of a visual, audible and haptic alert in dependence on the status of a vehicle request.

10. The vehicle request device of claim 9, wherein the output device is caused to provide at least one of a visual, audible and haptic alert when a requested vehicle arrives at the location associated with the device.

11. The vehicle request device of claim 9, wherein the output device comprises a light-emitting device, and is integral with the device.

12. The vehicle request device of claim 1, comprising a casing having means for fixing the device to a surface.

13. A vehicle request management system, the system comprising at least one vehicle request device according to claim 1 and a server, the server comprising:
   a communications device arranged to communicate with said at least one vehicle request device and a plurality of vehicles; and
   at least one processor arranged to select a vehicle from said plurality of vehicles in response to receiving a vehicle request from said at least one vehicle request device;
   wherein said communications device is arranged to receive positional data relating to the position of at least the selected vehicle over time,
   wherein said at least one processor is arranged to use the received positional data to monitor the status of the vehicle request, and
   wherein said communications device is arranged to transmit information relating to the status of the vehicle request to said at least one vehicle request device.

14. The vehicle request device of claim 1, wherein the input device is arranged to accept a second vehicle request only after a predetermined period of time following a first vehicle request.

15. The vehicle request device of claim 1, wherein said plurality of messages is displayed in an order representative of the order that requests corresponding to said messages are generated.

16. A method of requesting a plurality of vehicles by multiple users to a location, the method comprising:

receiving a user input, by each one of said multiple users, on a device and generating, per each input, a request for a vehicle to a location associated with the device in response thereto;

transmitting each generated vehicle request to a remote device;

receiving information from the remote device relating to the status of each one of the transmitted vehicle requests and using the information to generate a message for display indicative of the status of each vehicle request;

simultaneously displaying a plurality of generated messages on a display; and receiving an indication from the remote device that a vehicle that accepted the vehicle request has departed from the location associated with the device and stopping updating the status of a request relating to said vehicle and stopping the display of the related message in response thereto.

17. A non-transitory computer readable medium comprising computer readable instructions that, when executed on at least one processor, cause the at least one processor to perform a method according to claim 16.

* * * * *